United States Patent
Ramabhadran et al.

(10) Patent No.: US 10,574,144 B1
(45) Date of Patent: Feb. 25, 2020

(54) SYSTEM AND METHOD FOR A MAGNETICALLY COUPLED INDUCTOR BOOST AND MULTIPHASE BUCK CONVERTER WITH SPLIT DUTY CYCLE

(71) Applicant: General Electric Company, Schenectady, NY (US)

(72) Inventors: Ramanujam Ramabhadran, Niskayuna, NY (US); Kum-Kang Huh, Niskayuna, NY (US); Mohammed Agamy, Niskayuna, NY (US); Ahmed Elasser, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/145,406

(22) Filed: Sep. 28, 2018

(51) Int. Cl.
*H02M 3/158* (2006.01)
*H02M 1/084* (2006.01)
*H02M 1/14* (2006.01)
*B60L 53/20* (2019.01)
*H02M 1/00* (2006.01)

(52) U.S. Cl.
CPC ........... *H02M 3/1584* (2013.01); *B60L 53/20* (2019.02); *H02M 1/084* (2013.01); *H02M 1/14* (2013.01); *H02M 3/1582* (2013.01); *H02M 3/1588* (2013.01); *B60L 2210/12* (2013.01); *B60L 2210/14* (2013.01); *H02M 2001/007* (2013.01); *H02M 2003/1586* (2013.01)

(58) Field of Classification Search
CPC ......... H02M 2001/007; H02M 3/1584; H02M 3/1582; H02M 3/1588
See application file for complete search history.

(56) References Cited

U.S. PATENT DOCUMENTS 6,798,177 B1 * 9/2004 Liu ..................... H02M 3/1582
                                                 323/222
7,477,045 B2    1/2009 Schuellein et al.
9,641,008 B2    5/2017 Gati et al.
(Continued)

FOREIGN PATENT DOCUMENTS

CN      105958818 A     9/2016
KR     20100130161 A    12/2010

OTHER PUBLICATIONS

Czogalla, et al., "Automotive Application of Multi-Phase Coupled-Inductor DC-DC Converter." 38th IAS Annual Meeting on Conference Record of the Industry Applications Conference, vol. 3, pp. 1524-1529, Oct. 12-16, 2003.

*Primary Examiner* — Yusef A Ahmed
*Assistant Examiner* — Ishrat F Jamali
(74) *Attorney, Agent, or Firm* — Meagher Emanuel Laks Goldberg & Liao, LLP

(57) ABSTRACT

According to various embodiments, a DC/DC conversion system is disclosed. The DC/DC conversion system includes a boost converter coupled to a plurality of parallel buck converters. The boost converter and plurality of buck converters each include an inductor, where the inductors are magnetically coupled to each other. The DC/DC conversion system further includes a control system configured to control the boost converter and plurality of buck converters such that combined duty cycles of the plurality of buck converters are about equal to a duty cycle of the boost converter and the duty cycles of the plurality of buck converters are modulated out of phase.

20 Claims, 5 Drawing Sheets

(56) References Cited

U.S. PATENT DOCUMENTS

| | | |
|---|---|---|
| 9,871,449 B2 | 1/2018 | Hirukawa et al. |
| 2006/0197569 A1* | 9/2006 | Capodivacca ...... H02M 3/1584 |
| | | 327/175 |
| 2013/0038273 A1* | 2/2013 | Riggio ..................... H02J 7/00 |
| | | 320/107 |
| 2014/0266086 A1* | 9/2014 | Ikriannikov ............ H01F 30/12 |
| | | 323/259 |
| 2017/0126146 A1* | 5/2017 | Petersen ............... H02M 3/158 |
| 2018/0115236 A1 | 4/2018 | Wibowo et al. |

\* cited by examiner

Boost main switch Q1A ON

Buck main switch Q3A ON

Buck main switch Q3B ON

Boost main switch Q1B ON

Buck main switch Q3C ON

Buck main switch Q3D ON

SYSTEM AND METHOD FOR A MAGNETICALLY COUPLED INDUCTOR BOOST AND MULTIPHASE BUCK CONVERTER WITH SPLIT DUTY CYCLE

BACKGROUND OF THE INVENTION

Embodiments of the invention relate generally to electrical conversion system, and more particularly, to a DC/DC conversion system with magnetically coupled inductors and a multiphase buck component.

Automotive power electronics have been rapidly growing in recent years to meet environmental regulations and address an expanding electric and hybrid electric vehicle (EV/HEV) market. It is widely recognized that HEVs, such as mild hybrid electric vehicles (mHEV), are suitable for addressing fuel saving needs and $CO_2$ emission reductions. An increasing number of vehicles include a start-stop system which shuts down the engine while the car is stationary to save fuel. However, the actual use of the start-stop system is often limited by the need to maintain power levels for many of the features and auxiliary systems in vehicles such as navigation, heating, air-conditioning, radio, and other electronic equipment.

The power demands of these features have resulted in calls for a 48V electrical system, which provides more electrical capacity but avoids costly high-voltage batteries and power electronics used in traditional HEVs. The 48V electrical system contains a small electric generator that can assist the engine with up to tens of kilowatts of power and a small lithium-ion battery pack. A new lithium-ion 12-V battery is also included to assist start-stop setup by storing regenerative breaking energy for restarting. A conventional 48V mHEV system contains two batteries, 48V and 12V, with a DC/DC converter coupled between for energy exchange. Since the output power in this system typically varies from 3.5 kW to 5 kW, it is very crucial to maintain high average efficiencies over different output powers. While the 48V electrical system is typically designed for mHEVs, the system may also be used in data centers, communication centers, point of load systems, and medical applications as nonlimiting examples.

Conventional buck or buck/boost topologies are commonly used for the 48V system. However, this topology includes a limited range of inductor ripple cancellation over different duty ratios and a limited maximum ripple reduction rate. As such, there is a need for a DC/DC conversion system which addresses these issues while improving efficiency.

SUMMARY OF THE INVENTION

According to various embodiments, a DC/DC conversion system is disclosed. The DC/DC conversion system includes a boost converter coupled to a plurality of parallel buck converters. The boost converter and plurality of buck converters each include an inductor, where the inductors are magnetically coupled to each other. The DC/DC conversion system further includes a control system configured to control the boost converter and plurality of buck converters such that combined duty cycles of the plurality of buck converters are about equal to a duty cycle of the boost converter and the duty cycles of the plurality of buck converters are modulated out of phase.

According to various embodiments, a method of operating a DC/DC conversion system is disclosed. The method includes controlling a switching device in the boost converter to be on for about an equal amount of time that a switching device in each of the two buck converters is on combined. The method further includes controlling the switching device in each of the two buck converters such that one switching device in one buck converter is off when the other switching device in the other buck converter is on.

According to various embodiments, a DC/DC conversion system is disclosed. The DC/DC conversion system includes a first boost converter coupled to a first plurality of parallel buck converters. The first boost converter and first plurality of buck converters each include an inductor where this first plurality of inductors are magnetically coupled to each other. The DC/DC conversion system further includes a second boost converter coupled to a second plurality of parallel buck converters. The second boost converter and second plurality of buck converters each include an inductor where this second plurality of inductors are magnetically coupled to each other. The DC/DC conversion system also includes a control system configured to control the first boost converter, second boost converter, first plurality of buck converters, and second plurality of buck converters. The control system is configured such that combined duty cycles of the first plurality of buck converters is about equal to a duty cycle of the first boost converter, and the duty cycles of the first plurality of buck converters are modulated out of phase. The control system is further configured such that combined duty cycles of the second plurality of buck converters is about equal to a duty cycle of the second boost converter, and the duty cycles of the second plurality of buck converters are modulated out of phase. The control system is additionally configured such that duty cycles of the first and second boost converters are modulated out of phase.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Disclosed herein is a boost buck multiphase DC/DC conversion system for a 48V to 12V system. The inductors are magnetically coupled and the duty cycle of the buck component is split so that the total ON time of the buck component is equivalent to the ON time of the boost component.

Figure 1:
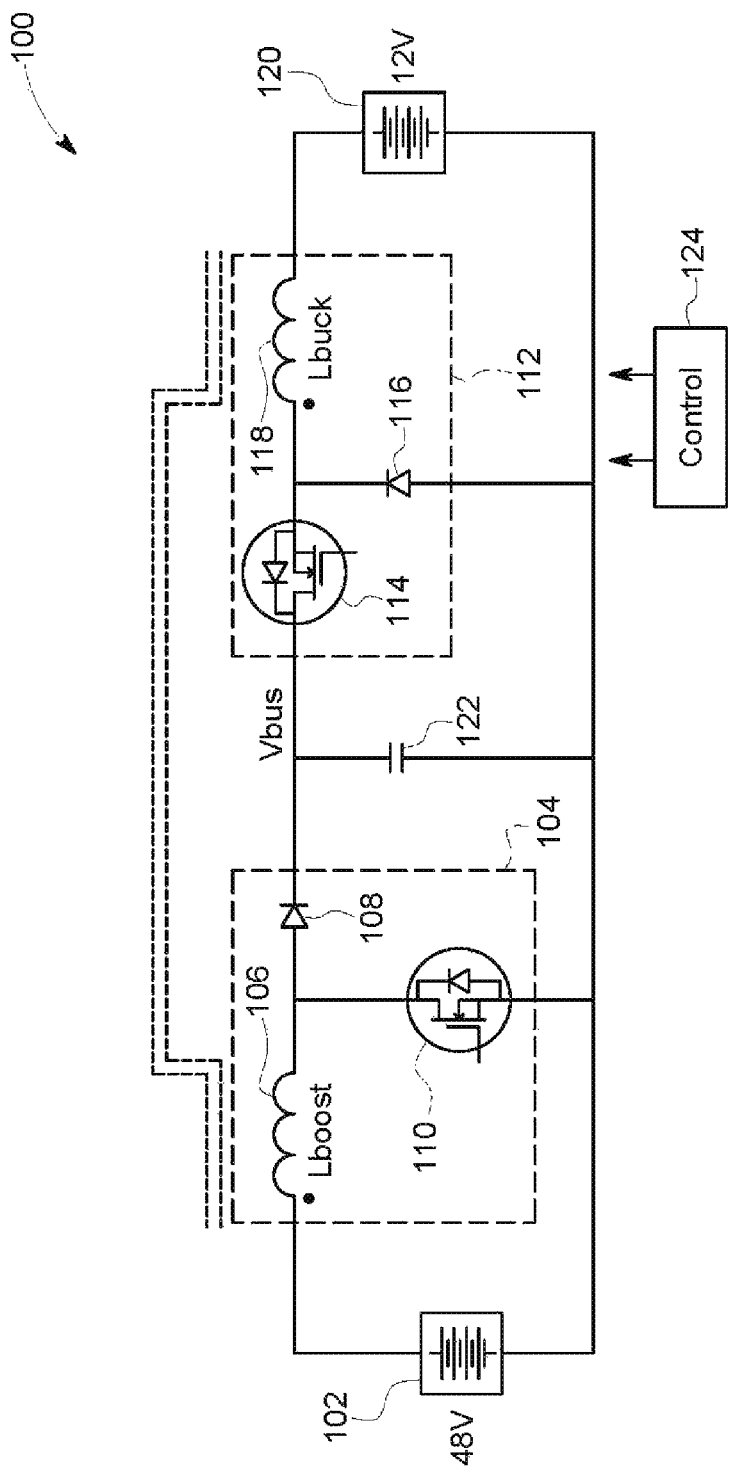
FIG. 1 is a schematic diagram of a DC/DC conversion system according to an embodiment of the present invention.

FIG. 1 illustrates a schematic diagram of a DC/DC conversion system 100 according to an embodiment of the present invention. The DC/DC conversion device 100 may be included in a vehicle such as an electric vehicle (EV), hybrid electric vehicle (HEV), or plug-in hybrid electric vehicle (PHEV). The DC/DC conversion device 100 may alternatively be included in a stationary electric drive system. An exemplary embodiment would include the DC/DC converter 100 in a 48V to 12V electric conversion system for a mild hybrid electric vehicle (mHEV). However, the DC/DC converter 100 may apply to other conversion systems as well, including data centers, communication centers, point of load systems, aviation systems, medical applications, and auxiliary power systems in general as nonlimiting examples. Furthermore, the 48V to 12V system is only exemplary and other voltage conversions may be utilized in alternative embodiments.

According to various embodiments, FIG. 1 illustrates a DC/DC conversion system 100. The DC/DC conversion system 100 includes a voltage source 102. The voltage source 102 may be an energy storage device, such as a battery, capacitor, or ultracapacitor, or a fuel cell, as nonlimiting examples. In an exemplary embodiment, the voltage source 102 is about 48V, but other voltages may be used in other embodiments. The voltage source 102 may also be an external voltage source, such as a charging station, utility grid, or other charging source external to a vehicle.

The voltage source 102 is coupled to a boost converter 104. The boost converter includes an inductor 106 coupled to a diode 108 and a switching device 110. The switching device 110 may include an antiparallel diode. As nonlimiting examples, the switching device 110 may be GaN HEMTs, Si or SiC MOSFETs, IGBTs, MCTs, Thyristors, GTOs, or IGCTs, though preferred embodiments would utilize MOSFETs. In an alternative embodiment, diode 108 may be replaced with another switching device to allow for bi-directional operation. The polarity of the inductor depends on whether ripple reduction is achieved at the input or output.

The boost converter 104 is coupled to a buck converter 112. The buck converter 112 includes a switching device 114 and a diode 116 coupled to an inductor 118. The switching device 114 may include an antiparallel diode. As nonlimiting examples, the switching device 114 may be GaN HEMTs, Si or SiC MOSFETs, IGBTs, MCTs, Thyristors, GTOs, or IGCTs, though preferred embodiments would utilize MOSFETs. In an alternative embodiment, diode 116 may be replaced with another switching device to allow for bi-directional operation. The polarity of the inductor depends on whether ripple reduction is achieved at the input or output.

The inductor 106 of the boost converter 104 and the inductor 118 of the buck converter 112 are magnetically coupled together, as shown by the dashed double lines. The polarities of the inductors 106 and 118 should be the same. Magnetically coupling the inductors 106 and 118 reduces ripple and obtains higher dynamic impedance.

The switching devices 110 and 114 of the boost converter 104 and buck converter 112 are pulse width modulated are the same time, with the same duty cycle and frequency.

A voltage load 120 is coupled to the buck converter 112. The voltage load 120 may be a second energy storage device, such as a battery, capacitor, or ultracapacitor, as nonlimiting examples. In an exemplary embodiment, the voltage load 120 is about 12V, but other voltages may be used in other embodiments. The voltage load 120 may also be an electrical machine, such as a traction motor or other permanent magnet or induction motor.

In an alternative embodiment, where diodes 108 and 116 are replaced with switching devices to allow for bi-directional operation, voltage source 102 and voltage load 120 may be reversed such that voltage source 102 would be the load and voltage load 120 would be the source.

A filter capacitor 122 may also be included between the boost converter 104 and buck converter 112. The system also includes a control system 124 configured to operate the switching devices 110 and 114.

Figure 2:
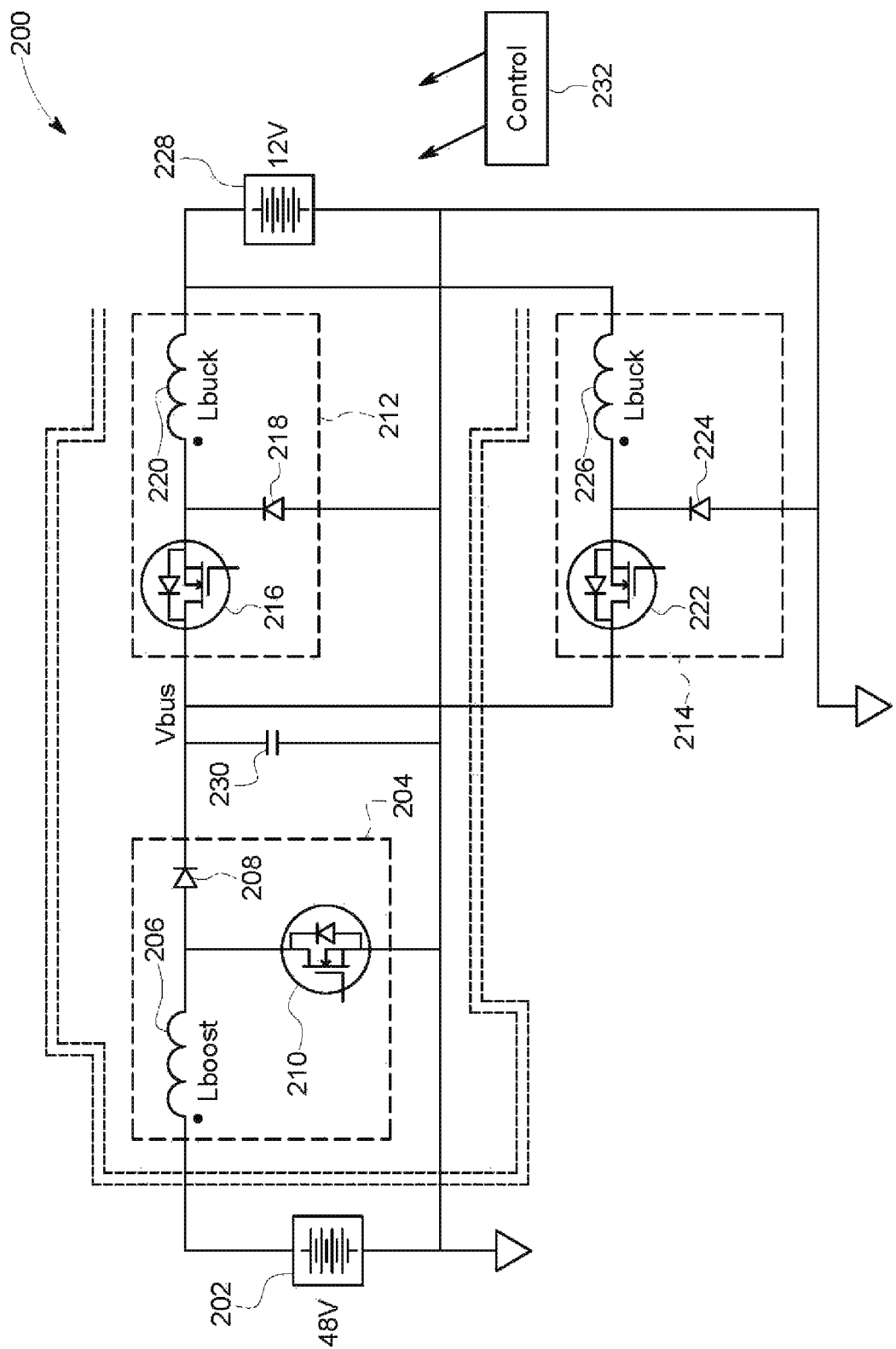
FIG. 2 is a schematic diagram of a DC/DC conversion system according to an alternative embodiment of the present invention.

According to an exemplary embodiment, FIG. 2 illustrates a DC/DC conversion system 200. The DC/DC conversion system 200 includes a voltage source 202. The voltage source 202 may be an energy storage device, such as a battery, capacitor, or ultracapacitor, or a fuel cell, as nonlimiting examples. In an exemplary embodiment, the voltage source 202 is about 48V, but other voltages may be used in other embodiments. The voltage source 202 may also be an external voltage source, such as a charging station, utility grid, or other charging source external to a vehicle.

The voltage source 202 is coupled to a boost converter 204. The boost converter includes an inductor 206 coupled to a diode 208 and a switching device 210. The switching device 210 may include an antiparallel diode. As nonlimiting examples, the switching device 210 may be GaN HEMTs, Si or SiC MOSFETs, IGBTs, MCTs, Thyristors, GTOs, or IGCTs, though preferred embodiments would utilize MOSFETs. In an alternative embodiment, diode 208 may be replaced with another switching device to allow for bi-directional operation. The polarity of the inductor depends on whether ripple reduction is achieved at the input or output. It is also to be noted that the boost converter 204 may be used for power factor correction, particularly in an embodiment where the voltage source 202 is an external voltage source.

The boost converter 204 is coupled to a plurality of buck converters, the plurality of buck converters being coupled to each other in parallel. In the embodiment shown, the boost converter 204 is coupled to a first buck converter 212 and a second buck converter 214. However, any number of buck converters coupled in parallel may be included in alternative embodiments. The first buck converter 212 includes a switching device 216 and a diode 218 coupled to an inductor 220. The switching device 216 may include an antiparallel diode. As nonlimiting examples, the switching device 216 may be GaN HEMTs, Si or SiC MOSFETs, IGBTs, MCTs, Thyristors, GTOs, or IGCTs, though preferred embodiments would utilize MOSFETs. In an alternative embodiment, diode 218 may be replaced with another switching device to allow for bi-directional operation. The polarity of the inductor depends on whether ripple reduction is achieved at the input or output. The second buck converter 214 includes a switching device 222 and a diode 224 coupled to an inductor 226. The switching device 222 may include an antiparallel diode. As nonlimiting examples, the switching device 222 may be GaN HEMTs, Si or SiC MOSFETs, IGBTs, MCTs, Thyristors, GTOs, or IGCTs, though preferred embodiments would utilize MOSFETs. In an alternative embodiment, diode 224 may be replaced with another switching device to allow for bi-directional operation. The polarity of the inductor depends on whether ripple reduction is achieved at the input or output.

The inductor 206 of the boost converter 204, and the inductors 220 and 226 of the first and second buck converters 212 and 214, respectively, are magnetically coupled together, as shown by the dashed double lines. The polarities of the inductors 206, 220, and 226 should be the same. Magnetically coupling the inductors 206, 220, and 226 reduces ripple and obtains higher dynamic impedance.

A voltage load 228 is coupled to the plurality of buck converters. In this embodiment, the voltage load 228 is coupled to the first buck converter 212 and the second buck converter 214. The voltage load 228 may be a second energy storage device, such as a battery, capacitor, or ultracapacitor, as nonlimiting examples. In an exemplary embodiment, the voltage load 228 is about 12V, but other voltages may be used in other embodiments. The voltage load 228 may also be an electrical machine, such as a traction motor or other permanent magnet or induction motor.

In an alternative embodiment, where diodes 208, 218, and 224 are replaced with switching devices to allow for bi-directional operation, voltage source 202 and voltage load 228 may be reversed such that voltage source 202 would be the load and voltage load 228 would be the source.

A filter capacitor 230 may also be included between the boost converter 204 and the plurality of buck converters (e.g. first and second buck converters 212 and 214). The system also includes a control system 232 configured to operate the switching devices 210, 216, and 222.

Figure 3:
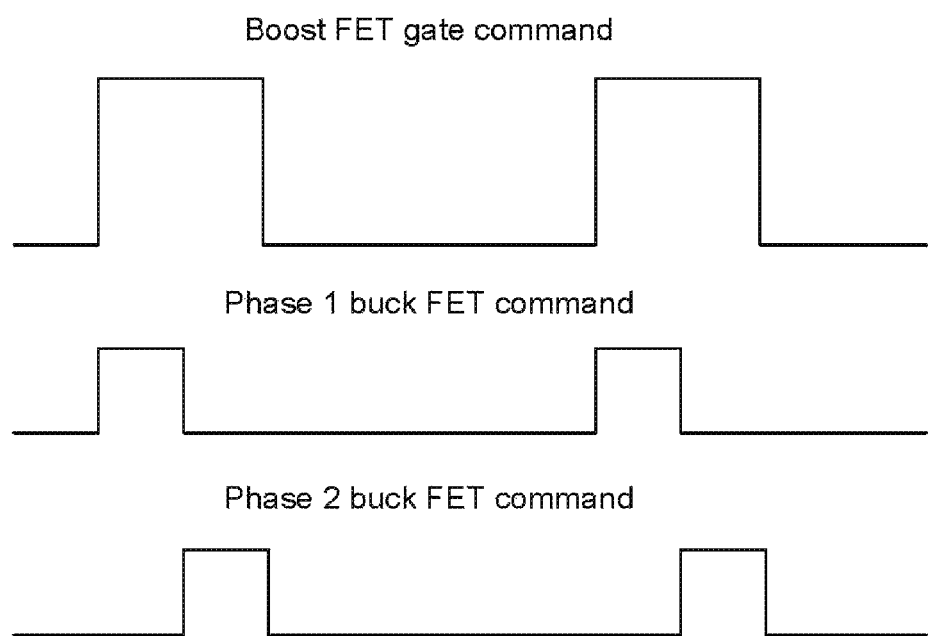
FIG. 3 is a pulse sequence diagram of a DC/DC conversion system according to an embodiment of the present invention.

FIG. 3 is a pulse sequence diagram of the DC/DC conversion system 200. The switching devices 210, 216, and 222 in the boost converter 204, first buck converter 212, and second buck converter 214, respectively, are pulsed width modulated. The duty cycle of the switching device 210 should be equal to the total duty cycle of the switching devices in the plurality of buck converters. For instance, as shown by FIG. 3, the duty cycle of the switching device 210 is equal to the duty cycle of switching device 216 and 222 combined. If three buck converters were included in parallel, the duty cycle of the switching device 210 would be equal to the duty cycle of the three switching devices included in the three buck converters. Furthermore, the switching devices of the plurality of buck converters are configured to be out of phase. For instance, as shown by FIG. 3, when switching device 216 is on, switching device 222 should be off. If three buck converters were included in parallel, three phases would be utilized such that one switching device is on for one phase, a second switching device is on for a second phase, and a third switching device is on for a third phase. This enables a high conversion efficiency at high density.

Figure 4:
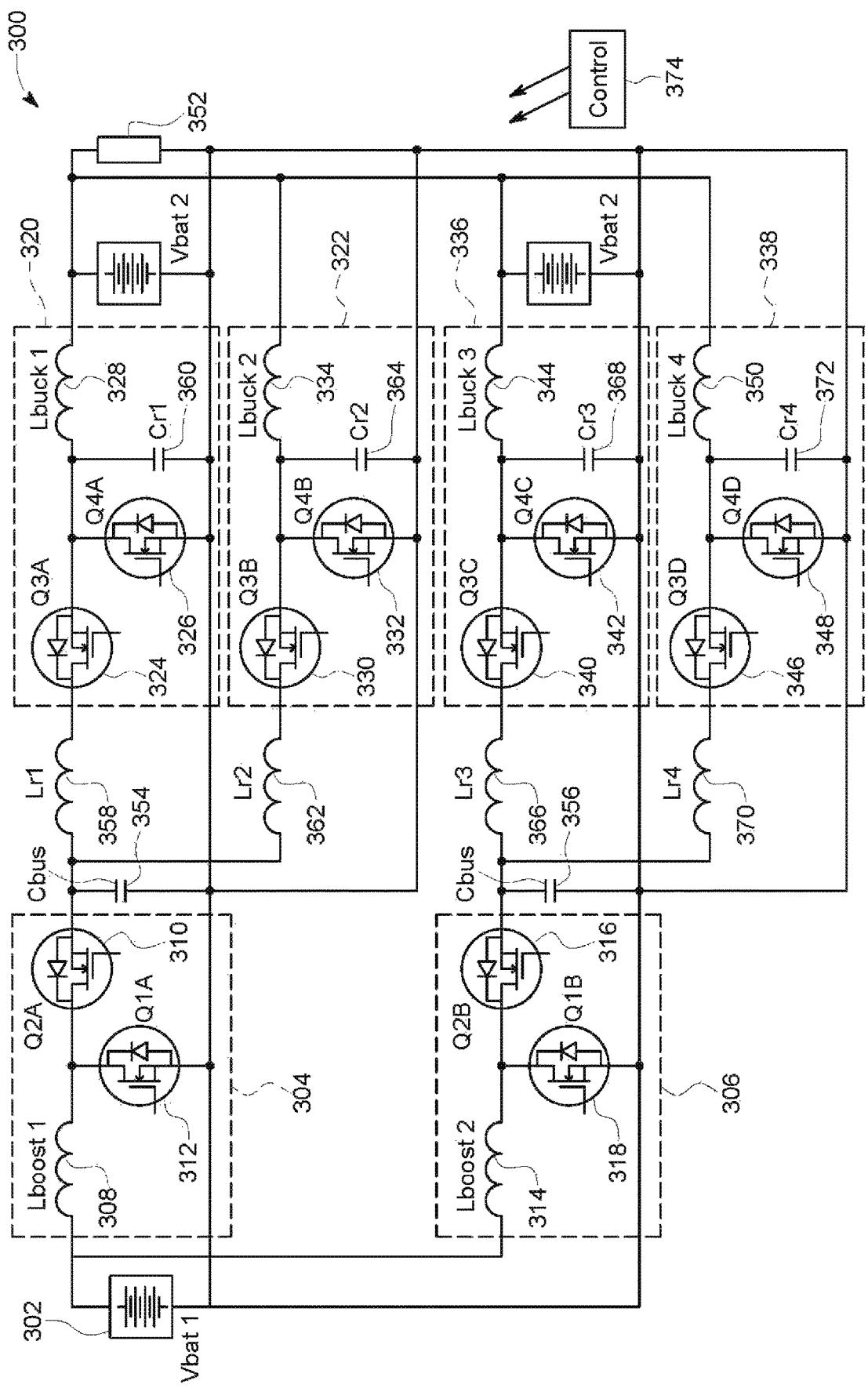
FIG. 4 is a schematic diagram of a DC/DC conversion system according to another alternative embodiment of the present invention.

According to an alternative embodiment, FIG. 4 illustrates a DC/DC conversion system 300. The DC/DC conversion system 300 includes a voltage source 302. The voltage source 302 may be an energy storage device, such as a battery, capacitor, or ultracapacitor, or a fuel cell, as nonlimiting examples. In an exemplary embodiment, the voltage source 302 is about 48V, but other voltages may be used in other embodiments. The voltage source 302 may also be an external voltage source, such as a charging station, utility grid, or other charging source external to a vehicle.

The voltage source 302 is coupled to a plurality of boost converters, the plurality of boost converters being coupled to each other in parallel. In the embodiment shown, the voltage source 302 is coupled to a first boost converter 304 and a second boost converter 306. The first boost converter 304 includes an inductor 308 coupled to switching devices 310 and 312. The switching devices 310 and 312 may include an antiparallel diode. As nonlimiting examples, the switching devices 310 and 312 may be GaN HEMTs, Si or SiC MOSFETs, IGBTs, MCTs, Thyristors, GTOs, or IGCTs, though preferred embodiments would utilize MOSFETs. The polarity of the inductor 308 depends on whether ripple reduction is achieved at the input or output. It is also to be noted that switching devices 310 and 312 are included for bi-directional operation, but switching device 310 may be replaced with a diode for a unidirectional boosting operation.

The second boost converter 306 includes an inductor 314 coupled to switching devices 316 and 318. The switching devices 316 and 318 may include an antiparallel diode. As nonlimiting examples, the switching devices 316 and 318 may be GaN HEMTs, Si or SiC MOSFETs, IGBTs, MCTs, Thyristors, GTOs, or IGCTs, though preferred embodiments would utilize MOSFETs. The polarity of the inductor 314 depends on whether ripple reduction is achieved at the input or output. It is also to be noted that switching devices 316 and 318 are included for bi-directional operation, but switching device 316 may be replaced with a diode for a unidirectional boosting operation.

Each boost converter in the DC/DC conversion system 300 is coupled to a plurality of buck converters, the plurality of buck converters being coupled to each other in parallel. In the embodiment shown, the first boost converter 304 is coupled to a first buck converter 320 and a second buck converter 322. However, any number of buck converters coupled in parallel may be included in alternative embodiments. The first buck converter 320 includes switching devices 324 and 326 coupled to an inductor 328. The switching devices 324 and 326 may include an antiparallel diode. As nonlimiting examples, the switching devices 324 and 326 may be GaN HEMTs, Si or SiC MOSFETs, IGBTs, MCTs, Thyristors, GTOs, or IGCTs, though preferred embodiments would utilize MOSFETs. In an alternative embodiment, switching device 326 may be replaced with a diode for unidirectional bucking operation. The polarity of the inductor 328 depends on whether ripple reduction is achieved at the input or output. The second buck converter 322 includes switching devices 330 and 332 coupled to an inductor 334. The switching devices 330 and 332 may include an antiparallel diode. As nonlimiting examples, the switching devices 330 and 332 may be GaN HEMTs, Si or SiC MOSFETs, IGBTs, MCTs, Thyristors, GTOs, or IGCTs, though preferred embodiments would utilize MOSFETs. In an alternative embodiment, switching device 332 may be replaced with a diode for unidirectional bucking operation. The polarity of the inductor 334 depends on whether ripple reduction is achieved at the input or output.

The inductor 308 of boost converter 304, and the inductors 328 and 334 of the first and second buck converters 320 and 322, respectively, are magnetically coupled together. Though not shown in FIG. 4, the magnetic coupling is similar to the double dashed lines shown in FIG. 2. The polarities in the inductors 308, 328, and 334 should be the same. Magnetically coupling the inductors 308, 328, and 334 reduces ripple and obtains higher dynamic impedance.

The second boost converter 306 is coupled to a third buck converter 336 and a fourth buck converter 338. However, any number of buck converters coupled in parallel may be included in alternative embodiments. The third buck converter 336 includes switching devices 340 and 342 coupled to an inductor 344. The switching devices 340 and 342 may include an antiparallel diode. As nonlimiting examples, the switching devices 340 and 342 may be GaN HEMTs, Si or SiC MOSFETs, IGBTs, MCTs, Thyristors, GTOs, or IGCTs, though preferred embodiments would utilize MOSFETs. In an alternative embodiment, switching device 342 may be replaced with a diode for unidirectional bucking operation. The polarity of the inductor 344 depends on whether ripple reduction is achieved at the input or output. The second buck converter 338 includes switching devices 346 and 348 coupled to an inductor 350. The switching devices 346 and 348 may include an antiparallel diode. As nonlimiting examples, the switching devices 346 and 348 may be GaN HEMTs, Si or SiC MOSFETs, IGBTs, MCTs, Thyristors, GTOs, or IGCTs, though preferred embodiments would utilize MOSFETs. In an alternative embodiment, switching device 348 may be replaced with a diode for unidirectional bucking operation. The polarity of the inductor 350 depends on whether ripple reduction is achieved at the input or output.

The inductor 314 of second boost converter 306, and the inductors 344 and 350 of the third and fourth buck converters 336 and 338, respectively, are magnetically coupled together. Though not shown in FIG. 4, the magnetic coupling is similar to the double dashed lines shown in FIG. 2. The polarities in the inductors 314, 344, and 350 should be the same. Magnetically coupling the inductors 314, 344, and 350 reduces ripple and obtains higher dynamic impedance.

A voltage load 352 is coupled to each of the buck converters. In this embodiment, the voltage load 352 is coupled to the first buck converter 320, the second buck converter 322, the third buck converter 336, and the fourth buck converter 338. The voltage load 352 may be a second energy storage device, such as a battery, capacitor, or ultracapacitor, as nonlimiting examples. In an exemplary embodiment, the voltage load 352 is about 12V, but other voltages may be used in other embodiments. The voltage load 352 may also be an electrical machine, such as a traction motor or other permanent magnet or induction motor.

A filter capacitor may also be included between each boost converter and buck converter. In the embodiment shown, a first filter capacitor 354 is included between the first boost converter 304 and buck converters 320 and 322, and a second filter capacitor 356 is included between the second boost converter 306 and buck converters 336 and 338.

A resonant circuit system may also be included as well if zero circuit switching is required. Each bucking section would include a resonant inductor and resonant capacitor as shown in FIG. 4. For instance, in the embodiment shown, resonant inductor 358 and resonant capacitor 360 would be included in the first bucking section, resonant inductor 362 and resonant capacitor 364 would be included in the second bucking section, resonant inductor 366 and resonant capacitor 368 would be included in the third bucking section, and resonant inductor 370 and resonant capacitor 372 would be included in the fourth bucking section.

The system also includes a control system 374 configured to operate the switching devices 310, 312, 316, 318, 324, 326, 330, 332, 340, 342, 346, and 348.

Figure 5:
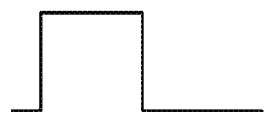
FIG. 5 is a pulse sequence diagram of a DC/DC conversion system according to an embodiment of the present invention.
Figure 5:
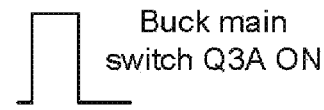
Figure 5:
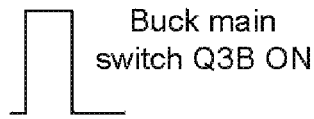
Figure 5:
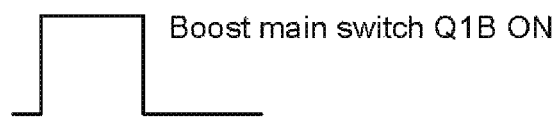
Figure 5:
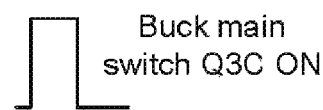
Figure 5:
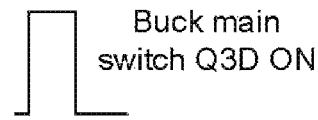

FIG. 5 is a pulse sequence diagram of the DC/DC conversion system 300. The switching devices 312 and 318 in the first and second boost converters 304 and 306, respectively, and the switching devices 324, 330, 340, and 346 in the first, second third, and fourth buck converters 320, 322, 336, and 338, respectively, are pulse width modulated. The duty cycle of the switching device 312 of the first boost converter 304 should be equal to the total duty cycle of the switching devices in the first plurality of buck converters. For instance, as shown by FIG. 5, the duty cycle of the switching device 312 is equal to the duty cycle of switching device 324 and 330 combined. If three buck converters were included in parallel, the duty cycle of the switching device 312 would be equal to the duty cycle of the three switching devices included in the three buck converters. Furthermore, the switching devices of the first plurality of buck converters are configured to be out of phase. For instance, as shown by FIG. 5, when switching device 324 is on, switching device 330 should be off. If three buck converters were included in parallel, three phases would be utilized such that one switching device is on for one phase, a second switching device is on for a second phase, and a third switching device is on for a third phase. This enables a high conversion efficiency at high density.

The duty cycle of the switching device 318 of the second boost converter 306 should be equal to the total duty cycle of the switching devices in the second plurality of buck converters. For instance, as shown by FIG. 5, the duty cycle of the switching device 318 is equal to the duty cycle of switching device 340 and 346 combined. If three buck converters were included in parallel, the duty cycle of the switching device 318 would be equal to the duty cycle of the three switching devices included in the three buck converters. Furthermore, the switching devices of the second plurality of buck converters are configured to be out of phase. For instance, as shown by FIG. 5, when switching device 340 is on, switching device 346 should be off. If three buck converters were included in parallel, three phases would be utilized such that one switching device is on for one phase, a second switching device is on for a second phase, and a third switching device is on for a third phase. This enables a high conversion efficiency at high density.

The switching devices of each boost and buck section are also configured to be out of phase. For instance, as shown by FIG. 5, when switching devices 312, 324, and 330 are operating, switching devices 318, 340, and 346 remain off. Similarly, when switching devices 318, 340, and 346 are operating, switching device 312, 324, and 330 remain off.

As such, disclosed herein is a split duty cycle control based magnetically coupled inductor boost buck conversion system that can enable multiphase buck or boost converter operation with magnetic coupling of the inductors.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A DC/DC conversion system comprising:
   a boost converter coupled to a plurality of parallel buck converters, the boost converter and plurality of buck converters each comprising an inductor, the inductors being magnetically coupled to each other; and
   a control system configured to control the boost converter and plurality of buck converters such that combined duty cycles of the plurality of buck converters are about equal to a duty cycle of the boost converter, and the duty cycles of the plurality of buck converters are modulated out of phase.

2. The DC/DC conversion system of claim 1, further comprising a voltage source coupled to an input of the boost converter.

3. The DC/DC conversion system of claim 2, wherein the voltage source comprises at least one of a battery, ultracapacitor, and fuel cell.

4. The DC/DC conversion system of claim 1, further comprising a voltage load coupled to outputs of the plurality of buck converters.

5. The DC/DC conversion system of claim 4, wherein the voltage load comprises one of a battery and ultracapacitor.

6. The DC/DC conversion system of claim 1, wherein the boost converter further comprises a diode coupled to a switching device.

7. The DC/DC conversion system of claim 1, wherein each of the buck converters further comprises a switching device coupled to a diode.

8. A method of operating a DC/DC conversion system, the DC/DC conversion system including a boost converter coupled to two parallel buck converters, the method comprising:
controlling a switching device in the boost converter to be conducting for about an equal amount of time that a switching device in each of the two buck converters is conducting combined; and
controlling the switching device in each of the two buck converters such that one switching device in one buck converter is not conducting when the other switching device in the other buck converter is conducting.

9. The method of claim 8, wherein the DC/DC conversion system further comprises a voltage source.

10. The method of claim 8, wherein the DC/DC conversion system further comprises a voltage load.

11. The method of claim 8, wherein the boost converter further comprises a diode coupled to a switching device.

12. The method of claim 8, wherein each of the two buck converters further comprises a switching device coupled to a diode.

13. A DC/DC conversion system comprising:
a first boost converter coupled to a first plurality of parallel buck converters, the first boost converter and first plurality of buck converters each comprising an inductor, this first plurality of inductors being magnetically coupled to each other;
a second boost converter coupled to a second plurality of parallel buck converters, the second boost converter and second plurality of buck converters each comprising an inductor, this second plurality of inductors being magnetically coupled to each other; and
a control system configured to control the first boost converter, second boost converter, first plurality of buck converters, and second plurality of buck converters such that:
combined duty cycles of the first plurality of buck converters is about equal to a duty cycle of the first boost converter, and the duty cycles of the first plurality of buck converters are modulated out of phase;
combined duty cycles of the second plurality of buck converters is about equal to a duty cycle of the second boost converter, and the duty cycles of the second plurality of buck converters are modulated out of phase; and
duty cycles of the first and second boost converters are modulated out of phase.

14. The DC/DC conversion system of claim 13, further comprising a voltage source coupled to an input of the first boost converter and an input of the second boost converter.

15. The DC/DC conversion system of claim 14, wherein the voltage source comprises at least one of a battery, ultracapacitor, and fuel cell.

16. The DC/DC conversion system of claim 13, further comprising a voltage load coupled to outputs of the first and second plurality of buck converters.

17. The DC/DC conversion system of claim 16, wherein the voltage load comprises one of a battery and ultracapacitor.

18. The DC/DC conversion system of claim 13, wherein the first and second boost converters are bi-directional.

19. The DC/DC conversion system of claim 13, wherein each of the buck converters are bi-directional.

20. The DC/DC conversion system of claim 13, further comprising a resonant circuit coupled to each of the buck converters.

* * * * *